Oct. 31, 1950  J. W. MYNSSEN  2,528,163
VEHICLE WHEEL WITH DEMOUNTABLE FELLY
Filed Aug. 27, 1945
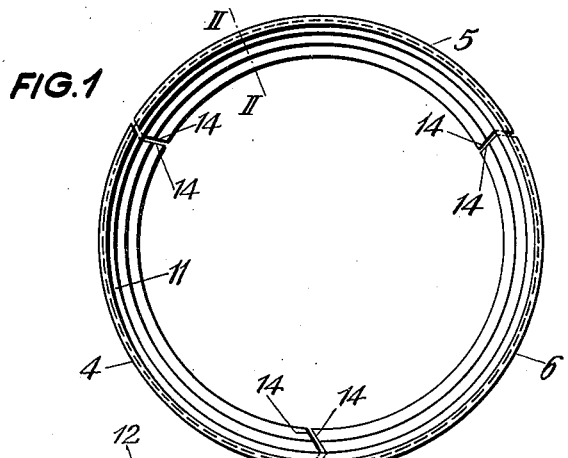
FIG.1
FIG.2
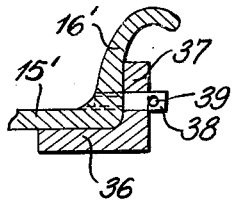
FIG.7
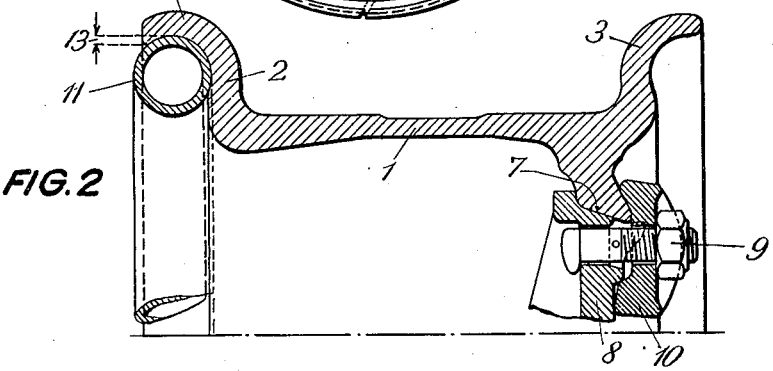
FIG.3
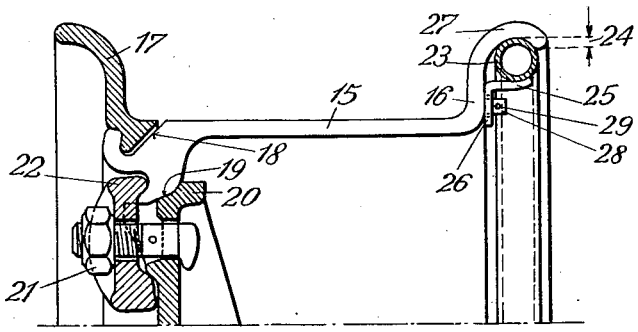
FIG.4
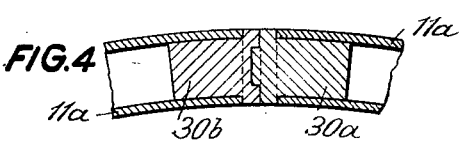
FIG.5
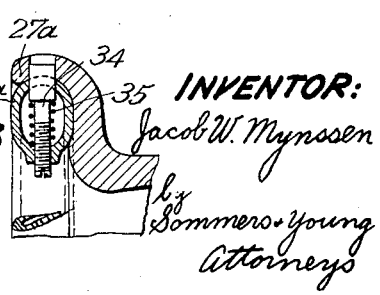
FIG.6
INVENTOR:
Jacob W. Mynssen
by Sommers & Young
Attorneys Patented Oct. 31, 1950

2,528,163

UNITED STATES PATENT OFFICE 2,528,163

VEHICLE WHEEL WITH DEMOUNTABLE FELLY

Jacob Willem Mÿnssen, Schaffhouse, Switzerland, assignor to Aktiengesellschaft der Eisen- und Stahlwerke vormals Georg Fischer, Schaffhouse, Switzerland Application August 27, 1945, Serial No. 612,811
In Switzerland January 28, 1944

Section 1, Public Law 690, August 8, 1946
Patent expires January 28, 1964

11 Claims. (Cl. 301—31)

1

Various forms of vehicle wheels comprising a demountable felly are known, in which the latter is at least partially split transversely and at one point at least of its circumference; and which is supported on the wheel disc or spider in a plane displaced, laterally of its median plane, into proximity of a felly flange. In such wheels tilting moments are brought to act upon the felly due to the wheel load, which are transmitted onto the felly fastening means secured to the wheel body. Said tilting moments, on the other hand, tend to have the felly butt ends pressed against each other with great force at their split point or points. When such a wheel, mounted by a tire, rolls under load on the road, the felly butt faces on that side which is not supported by the wheel body, that is, the felly flange which is remote from the supporting plane of the wheel disc or spider, do not remain entirely immovable with respect to each other, but undergo slight movements which may produce an undesired wear of the felly butt faces when the felly, e. g., is made of a light metal alloy. In order to eliminate this objectionable feature, the butt ends of light metal fellies have been reinforced, e. g., by steel plating or by a harder metal coating sprayed thereon. Such measures, however, are not satisfactory in all parts.

The present invention relates to a wheel with demountable felly of the class referred to, in which a self-supporting detachable stay ring is provided for supporting the cantilevered split felly portions. The main object of my improvement is to relieve the butt ends of the felly segments and thus prevent any undue wear thereof. I attain this and related objects by the felly and felly stay ring shown, in two embodiments, in the accompanying drawing, in which Fig. 1 shows a side view of a detachable three-segment split felly;

Fig. 2 a radial felly section, in larger scale, on line II—II of Fig. 1, and a peripheral portion of the wheel disc or spider on which the demountable felly is supported and secured by proper means;

Fig. 3 a second embodiment of the invention in radial section and including a peripheral wheel-spider portion on which the demountable felly is supported and secured by appropriate means;

Fig. 4 a radial section, at right angles to the wheel axle, of one form of joint of a split stay ring;

Fig. 5 a partial side view of a second form of split stay ring;

Fig. 6 a radial section of stay ring and appurtenant felly flange, including means for securing the ring to the felly flange; and Fig. 7 is a cross-sectional view partly broken away illustrating a further embodiment in which the stay ring is of angle shape in cross-section.

The three segments 4—6 of the felly 1 are integral parts, i. e. not subdivided in cross section (Fig. 2). The felly 1 is of trough-form and comprises two flanges 2 and 3 curved upwardly and outwardly to form a horn or overhang 12. The said flanges secure the beads of the tire (not shown) against an axial displacement. The felly is provided with a skew seat 7 on its inner bottom circumference which is abutting against and supported by a similar skew seat of the wheel disc or spider 8. The felly segments are detachably secured to the disc 8 by means of bolts and nuts 9 through the intermediary of clamping washers 10.

The flange 2, that is the cantilevered felly flange bears on a tubular stay ring 11. The latter, shown here as being of circular section, is a self supporting integral structure closed all around, and is closely engaged against the inner arch of the felly horn 12, that is the latter overhangs the stay ring by a certain rise 13 (Fig. 2) and secures the stay ring against axial displacement. The rise 13 is so dimensioned that the closed stay ring 11 may be sprung into and out of engagement with the felly horn 12 by slightly expanding the diameter of the felly 1. The diameter of the ring 11 is made such as to permit of keeping the butt faces 14 of the felly segments slightly separated. This latter feature prevents any forces acting radially and inwardly upon the felly segments from being transmitted upon the butt faces 14 thereof, and thus prevents a wear of the latter.

In the embodiment shown in Fig. 3, which is a section at the felly split, the felly bottom 15 is made integral with one side flange 16, and this felly portion is split transversely at one point only. The second side flange 17 of the demountable felly is made in the form of a closed ring structure adapted to engage a groove 18 of the felly bottom 15. By decreasing the diameter of the latter, the said felly part 15, 16 may be sprung, in a manner known per se, into engagement with the ring flange 17. A ring abutment having a skew seat 19 is provided on the inner bottom periphery of the felly bottom 15 in proximity to the groove 18. The said abutment is supported on a correspondingly adapted skew face of the wheel disc 20 and secured thereto by means of bolts and nuts 21 and clamping washers 22. A closed tubular ring 23 fits snugly against the inner curve of the felly horn 27, the latter being remote from the skew face 19, and partly encircling the outer periphery of the ring 23 so that same is radially engaged by a certain amount 24 and thereby secured against axial displacement. The rise 24 is made just of such size as to permit of springing the closed stay ring 23 into and out of engagement with the felly horn 27 by slightly expanding the diameter of the latter. The stay-ring diameter is made such that the butt faces at the split of the felly horn 27 do not contact each other. Angle lugs 25 are welded to the stay ring 23, the legs 26 of which are provided with bores engaged by studs 28 which are anchored in the felly flange 16. The lugs 25 26 are secured in position on the latter by means of split pins 29 mounted in the studs 28. The device 25—29 serves as additional safety measure for preventing an axial displacement of the stay ring 23.

In the embodiments described, the stay rings 11 and 23 are closed structures. Other embodiments (Figs. 4 and 5) may comprise transversely split rings, the butt faces of such a split ring contacting each other, and wherein care must be taken to peripherally stagger the stay-ring split and a felly split. In the case of a split stay ring, the rise 13 or 24 may be increased.

In the form of split stay ring 11a shown in Fig. 4, which shows the joint in median section, the tube ends are suitably plugged and capped by the male and female members 30a and 30b respectively, so as to reduce the specific surface bearing pressure on the butt faces.

In the form of joint shown in Fig. 5, the butt faces of the split stay ring 11b are secured against lateral displacement by the plug latch 31 loaded by the spring 32 which abuts against the bolt 33. The position of the latch 31 relative to the joint is governed by the position of the set screw 34 in the slot 11c. In the position shown, the joint is aligned, and the stay ring 11b mounted on the felly flange.

Instead of circular cross section, the stay ring 11 or 23 may be of any other cross section. In Fig. 6 a tubular ring 23a, which is provided with flattened sides, is secured against axial displacement or circumferential creeping by means of screw pins 34. The pin head is engaged in a bore of the felly horn 27a, and the threaded portion of the shank is secured against rotation by the spring 35 bearing on the said head.

The present invention is not limited to stay rings supporting the felly horn, but also affords a means for supporting the inner periphery of the felly bottom in proximity of one or the other side flange by means of a stay ring of angle section, which is suitably secured against axial displacement, e. g. by means shown in Fig. 3 or 6.

As shown in Fig. 7 the stay ring may be of angular cross-section, one of its legs 36 supporting the felly bottom 15' and the other leg 37 supporting the felly flange 16'. Studs 38 secured in the felly flange 16' and split pins 39 serve for securing the stay ring in position.

What I claim and desire to secure by Letters Patent is:

1. Vehicle wheel comprising a wheel body and a demountable felly provided with flanges near its edges, said felly being split transversely at at least one point and being circumferentially supported on said wheel body in a plane disposed in proximity of one of the felly flanges, a demountable self-supporting stay-ring for securely supporting the other felly flange which is remote from said supporting plane, and means provided on said last mentioned felly flange for securing said stay-ring against axial displacement.

2. Vehicle wheel having a demountable felly according to claim 1, and in which the stray ring is in the form of a circumferentially closed structure.

3. Vehicle wheel having a demountable felly according to claim 1 and in which the stay-ring is transversely split.

4. Vehicle wheel with demountable felly according to claim 1, and in which the stay ring for the felly flange which is remote from said supporting plane is of hollow section.

5. Vehicle wheel with demountable felly according to claim 1, and means detachably engaging the felly flange which is remote from said supporting plane and the stay-ring for the purpose of preventing a circumferential creeping of said ring.

6. Vehicle wheel with demountable felly according to claim 1, and in which the stay-ring securing means comprises a flange-horn which overlaps the outer circumference of the stay-ring.

7. Vehicle wheel with demountable felly according to claim 1, and in which the stay ring is of split hollow section, a horn on the felly-flange remote from the supporting plane for gripping of said ring and circumferentially overlapping same, and a spring-loaded latch disposed at one end of the split ring the other end of said ring having a recess in which said latch engages for the purpose of aligning the joint butt faces of the ring.

8. Vehicle wheel with demountable felly according to claim 1, and in which the stay-ring has a split hollow section, a felly horn circumferentially overlapping and gripping the stay-ring, plug means capping the stay-ring joint faces and abutting each other for the purpose of aligning the said faces and for reducing the specific bearing pressure acting on the latter.

9. Vehicle wheel with demountable felly according to claim 1, and in which the profile of the stay-ring is of angle section, one leg of the latter supporting the felly bottom and the other supporting the felly flange.

10. Vehicle wheel with demountable felly according to claim 1, and in which angle lugs are disposed circumferentially on the outside of the felly flange which is remote from the plane of support for the purpose of additionally securing the stay-ring against an outward axial displacement, one leg of said lugs being welded to the stay ring inner periphery and the other leg being detachably secured to the said felly flange.

11. In a vehicle wheel according to claim 1, and in which the said stay-ring and the felly flange are provided with bores and additional securing means for securing the stay-ring against axial displacement relative to the felly flange, which is remote from the plane of support, said additional securing means comprising a spring-loaded screw pin radially engaging the bores in the said ring and felly flange.

JACOB WILLEM MŸNSSEN.

REFERENCES CITED

The following references are of record in the file of this patent:

UNITED STATES PATENTS

| Number | Name | Date |
| --- | --- | --- |
| 2,065,866 | Mijnssen | Dec. 29, 1936 |